United States Patent [19]

Levenson

[11] 4,361,036
[45] Nov. 30, 1982

[54] ENGINE ANALYZER

[76] Inventor: Sol J. Levenson, 2636 S. Belvoir Blvd., University Heights, Ohio 44118

[21] Appl. No.: 223,334

[22] Filed: Jan. 8, 1981

[51] Int. Cl.³ .................................... G01M 15/00
[52] U.S. Cl. .................. 73/116; 123/169 R; 374/144
[58] Field of Search .............. 73/346, 359 R, 116; 123/169 R, 438, 480, 588

[56] References Cited

U.S. PATENT DOCUMENTS

| | | | |
|---|---|---|---|
| 935,154 | 7/1908 | Hopkins | 136/235 |
| 1,084,838 | 1/1914 | Beck | |
| 1,993,897 | 3/1935 | Renard | 123/169 |
| 3,754,139 | 8/1973 | Swithenbank et al. | 250/33.3 |
| 3,916,622 | 11/1975 | Gospodar | 73/346 X |
| 3,940,987 | 3/1976 | Green | 73/346 |

*Primary Examiner*—Jerry W. Myracle
*Attorney, Agent, or Firm*—Yount & Tarolli

[57] ABSTRACT

Apparatus senses the temperature in a cylinder of an internal combustion engine. The apparatus comprises a spark plug having a central electrode located on the axis of the spark plug, a ceramic insulator encircling the centrally located electrode, a metal casing encircling the ceramic insulator, and a second electrode extending from the metal casing to a position adjacent to the central electrode. The metal casing has continuous threads formed therein and encircling the metal casing for threaded engagement with corresponding threads of an internal combustion engine. A thermocouple is located within the outer periphery of the metal casing and extends to a position adjacent to the gap between the electrodes. The thermocouple has a temperature-sensing junction adjacent to the gap and which junction is located in the cylinder when the spark plug is threaded with the corresponding threads of the engine. A meter connected with the thermocouple indicates the temperature in the cylinder when the engine is operated.

8 Claims, 10 Drawing Figures

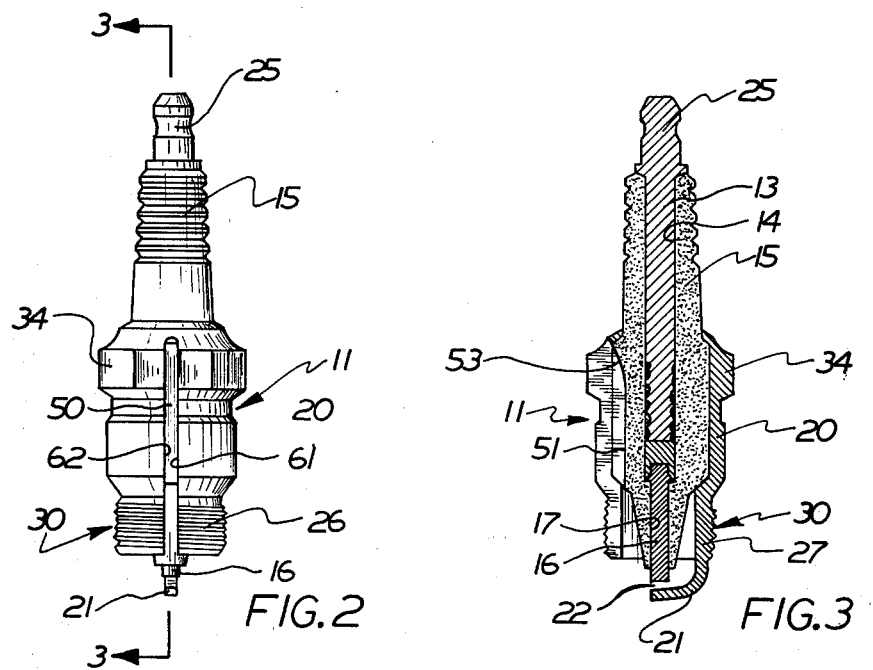
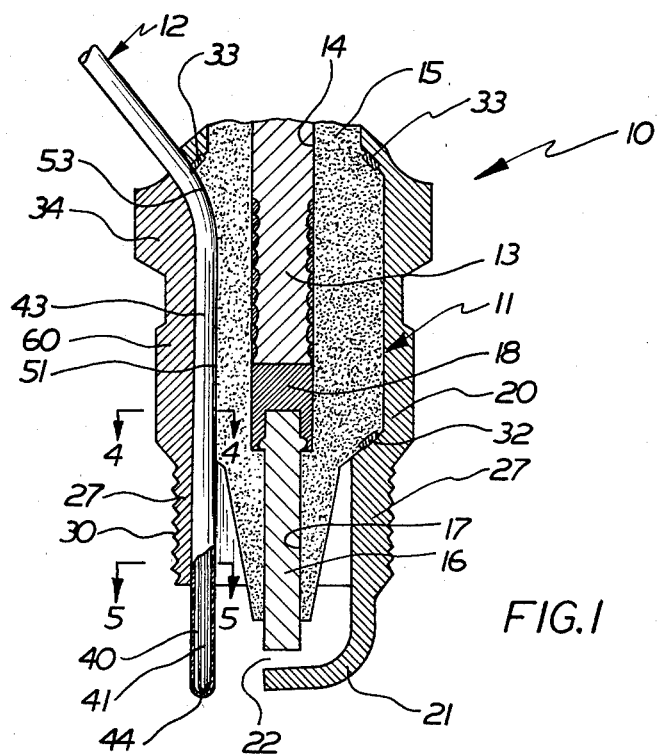

ENGINE ANALYZER

BACKGROUND OF THE INVENTION

The present invention relates to analyzing the operation of an internal combustion engine. In particular, the invention relates to a device for sensing the temperature in the cylinders of an internal combustion engine and to a method of adjusting the air-fuel ratio depending upon the temperature sensed.

The internal combustion engine belongs to the general class of engines known as heat engines. Heat engines are operated by heat, some of which is converted to useful work. In internal combustion engines the heat is produced by burning an air-fuel mixture in the cylinders. The air-fuel mixture is usually ignited by a spark from a spark plug mounted in the cylinder head.

The temperature in the cylinder of an internal combustion engine is an indicator of certain engine parameters. Specifically, it is well known that the temperature of the combusting materials in the cylinders of an internal combustion engine is an indication of the stoichiometry of the chemical reaction taking place. As an air-fuel mixture approaches its stoichiometrically correct composition, more heat is generated per cycle, and also less fuel is discharged from the cylinder unburned. Thus, the temperature in a cylinder of an internal combustion engine is an indicator of the engine efficiency and the air-fuel ratio of the mixture supplied to the cylinder.

Several ways to measure the temperature in the cylinder of an internal combustion engine are known. Certain of these methods require modification of the engine. A method of measuring the temperature in an internal combustion engine without modifying the engine is shown in U.S. Pat. No. 3,754,139. This patent discloses a device capable of measuring the infra-red radiation given off by the air-fuel mixture combusting in the cylinder. The infra-red detector is placed over a spark plug having a transparent insulator which allows the infra-red radiation to pass from the burning air-fuel mixture to the infra-red detector. The amount of infra-red radiation given off can be used to determine approximate flame temperature. However, the infra-red detector cannot discriminate among sources of infra-red radiation it receives. There are various sources of infra-red radiation in an internal combustion engine such as the burning air-fuel mixture, the exhaust valve, and the cylinder walls. In addition, these sources of infra-red radiation can have different and changing emissivity coefficients due to a buildup of corrosion or a carbon coating. These changing factors can affect the reliability of the infra-red detector.

U.S. Pat. No. 935,154 discloses the use of a thermocouple to measure the temperature in the cylinder of an internal combustion engine. The thermocouple is mounted in a spark plug specially designed to accommodate the thermocouple. The spark plug has a ground electrode extending from the threaded base of the spark plug as is typical in conventional spark plugs. However, the second electrode is offset from the axis of the plug in a direction perpendicular to its axis. A thermocouple extends through the insulator bushing adjacent to the offset electrode.

Most engine manufacturers recommend a spark plug for use in the engine. The use of a non-recommended plug will affect engine performance. The geometry of the spark plug described in U.S. Pat. No. 935,154 is not the geometry of a spark plug which is recommended for any engine. More specifically, a recommended spark plug has an axially located center electrode and electrode geometry specifically designed for the application for which it is intended. The configuration of the electrode in a recommended spark plug determines many operating characteristics of a spark plug which are important for normal engine operation. The use of a spark plug in an engine which is not the spark plug recommended for the engine will result in abnormal engine operation.

Another method of determining whether an engine is receiving the proper air-fuel ratio may be considered a manual method. Some experienced individuals can look at a spark plug and determine whether the proper air-fuel ratio is being delivered to the engine by the color of the deposit on the porcelain of the spark plug. This, of course, is subject to human error and requires substantial experience.

SUMMARY OF THE PRESENT INVENTION

The present invention provides a method of measuring the temperature inside the cylinder of an internal combustion engine. The temperature can be measured without modification of the engine. The present invention involves use of a recommended spark plug for an engine assembled with a thermocouple to measure the temperature in a cylinder of the engine without altering the operational characteristics of the recommended spark plug and without requiring modification of the engine. The invention provides for a rapid response or temperature measurement upon engine acceleration even for engines having a fuel enrichment system.

Specifically, a longitudinal groove is formed along substantially the full length of the threaded metal shell of a recommended spark plug. A thermocouple is inserted in the groove in such a manner as to allow the temperature sensitive junction of the thermocouple to extend beyond the base of the spark plug. The groove containing the thermocouple is filled with a brazing material. The metal shell and brazing material of the spark plug are shaped and threaded to allow the plug to be threaded into the cylinder head. The thermocouple wires extending from the spark plug are connected to a suitable read-out device. The read-out device may be digital, analog (such as a voltmeter) or a written read out on a chart or the like. The read-out device reads the temperature within the cylinder depending upon the voltage created.

The recommended spark plug modified according to the present invention retains the characteristics of an unmodified recommended spark plug. The electrical characteristics of the spark plug are not affected by the modification since the electrode shape and spacing are the same as an unmodified spark plug and the thermocouple is located properly relative to the electrodes. A recommended spark plug modified according to the present invention also retains the same electrode geometry with respect to the engine cylinder.

The present invention uses a thermocouple to measure the temperature in the engine cylinder. The thermocouple allows the temperature in the cylinder to be directly measured rather than by measuring a phenomenon of the combustion engine process such as radiation of infra-red energy. Because the temperature is directly measured, the present invention can be used with any fuel. Specifically, the present invention directly measures the temperature without discriminating between fuels.

The thermocouple junction is located far enough away from the cylinder head and spark plug electrode to obtain accurate temperature measurement, but not so far as to interfere with piston movement. Typically, the thermocouple junction is grounded to the surrounding thermocouple shield to minimize electrical interference from adjacent high voltage electrical surges in the spark plug wire and the spark plug center electrode.

An engine can have a recommended spark plug modified according to the present invention installed in each cylinder. The temperature in each cylinder is then monitored individually and successively by connecting each thermocouple associated with each spark plug to the read-out device. The read-out device can be constructed to indicate the average tempearture in the cylinder directly.

A particular engine receiving a proper air-fuel ratio has a known proper particular average temperature in the cylinder. A recommended spark plug modified according to the present invention can be used to monitor the cylinder temperature. The temperature measured by the thermocouple can be compared with the known proper temperature for that particular engine. By monitoring the temperature in the cylinder of the engine whose air-to-fuel ratio is to be adjusted, the air-to-fuel ratio can be set to the correct composition.

When an engine has a recommended spark plug modified according to the present invention installed in each cylinder in the engine, the carburetor and the intake manifold can be checked for improper functioning. If the intake manifold is properly designed and functioning properly, all the cylinders will receive the same correct air-to-fuel ratio and all cylinders will operate at approximately the same temperature. If however, a cylinder is receiving an air-fuel mixture which is richer than the correct mixture, that cylinder will operate at a lower temperature than the other cylinders.

BRIEF DESCRIPTION OF THE DRAWINGS

Further features and advantages of the present invention will be apparent to those skilled in the art to which the invention pertains from the following detailed description of a preferred embodiment of the invention made with reference to the annexed drawings wherein:

FIG. 1 is a cross sectional view of a spark plug thermocouple assembly of the present invention;

FIG. 2 is a view of a recommended spark plug which has been partially modified in accordance with the present invention;

FIG. 3 is a sectional view taken along lines 3—3 of FIG. 2;

DETAILED DESCRIPTION OF THE PREFERRED EMBODIMENT

Figure 4:
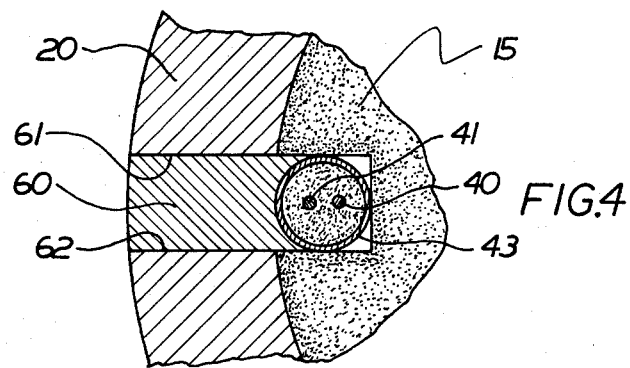
FIG. 4 is a partial sectional view of the spark plug thermocouple assembly of FIG. 1 taken along lines 4—4 of FIG. 1.

As noted hereinabove, the present invention relates to a method of analyzing and then adjusting an internal combustion engine operating parameter. The invention specifically relates to a method of adjusting the air-to-fuel ratio of the air-fuel mixture supplied to the cylinders of an internal combustion engine by measuring the temperature in one or more cylinders with a thermocouple mounted in a spark plug recommended for the engine. As representative of a specific embodiment of the present invention, a spark plug thermocouple assembly generally designated by reference numeral 10 is illustrated in the drawings.

Internal combustion engines have a particular spark plug which is recommended by the engine manufacturer for use in that engine. The spark plug thermocouple assembly 10 is used to analyze an engine and includes a spark plug 11 which is recommended by the engine manufacturer and a thermocouple 12.

The spark plug 11 is of a generally conventional design. The spark plug 11 includes a center post 13 which is located in a passage 14 in ceramic sleeve 15. As shown in FIG. 1, at the lower end of the ceramic sleeve 15 there is mounted a center electrode 16. The center electrode 16 is located in a passage 17 in the ceramic sleeve 15. Resistor 18 is disposed in passage 14 between center post 13 and center electrode 16 and abuts the end of center post 13 and center electrode 16. The center electrode 16, as shown in FIG. 1, projects beyond the tip of the ceramic sleeve 15.

A metal shell 20 encircles the ceramic sleeve 15. The metal shell 20 has a projecting ground electrode portion designated by reference numeral 21. A portion of the ground electrode 21 extends generally parallel to the axis of the spark plug 11. The remaining portion of the ground electrode 21 is bent approximately 90 degrees toward the center electrode 16 and extends adjacent to the center electrode 16. The ground electrode 21 is axially displaced from the center electrode 16 to form a gap 22.

Figure 8:
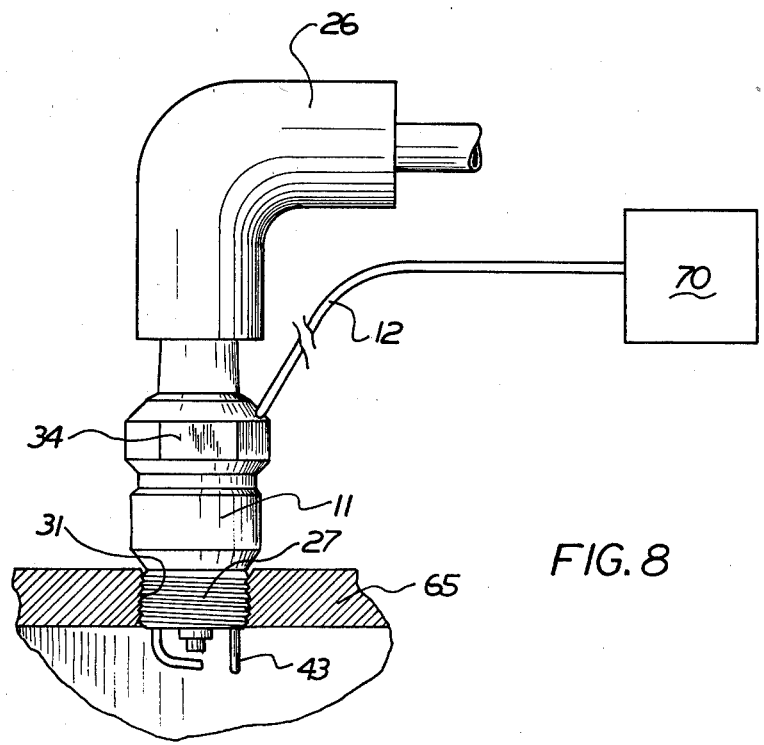
FIG. 8 is a view of one of the spark plugs of FIG. 1 mounted in an engine with the leads of the thermocouple extending from the spark plug to the voltmeter.

The lower end of the metal shell 20 has a threaded base 26. The threads are designated 30. The threads 30 are adapted to be received in corresponding threads 31 in an internal combustion engine (see FIG. 8).

Recommended spark plugs typically have two seals provided between the ceramic sleeve 15 and the metal casing 20. Each seal encircles the periphery of the ceramic sleeve 15. The lower seal 32 is located near the threaded base 26. The upper seal 33, is located above the hex head 34.

The thermocouple, which forms a part of the spark plug thermocouple assembly 10, is of generally conventional construction. Specifically, the thermocouple includes two wires of dissimilar metal, designated 40 and 41, see FIG. 6. The wires 40, 41 are enclosed by a shield 43 which is filled with an insulating material which encircles the wires 40, 41. The insulating material is of any conventional material, preferably magnesium oxide. The wires 40, 41 are fused together to form a temperature-sensing junction, designated 44. At the temperature-sensing junction, the wires 40, 41 are also fused to the sheath 43, thus making the thermocouple what is known as a grounded junction thermocouple.

The grounded junction thermocouple 12 offers two advantages over ungrounded thermocouples. First, the grounded junction provides faster response to a change in the temperature in the cylinder. This allows engine adjustments to be made faster since less time is required to determine the effect of an adjustment. Second, the grounded junction reduces the effect of electro-magnetic interference from nearby intermittent magnetic fields around the high voltage spark plug wires.

The upper end of the center post 13 is provided with a suitable electrical connector 25 which extends above the ceramic sleeve 15, as shown in FIG. 3. Electrical connector 25 is adapted to be received in a suitable electrical socket 27 connected to a source of electrical energy associated with the internal combustion engine.

The thermocouple 12 is assembled with the spark plug 11 to form the spark plug thermocouple assembly 10. Specifically, in the preferred embodiment, the spark plug 11 is provided with a groove, generally designated 50 and which extends axially in the spark plug 11. Specifically, the groove 50 extends parallel to the axis of the center post 13 of the spark plug 11. The groove 50 is formed in a grinding operation. A grinding wheel is moved radially into engagement with the outer portion of the metal sleeve 20, grinds through the metal sleeve and grinds away a portion of the ceramic sleeve 15.

As best shown in FIG. 3, the groove has a bottom surface designated 51, which is formed in the ceramic sleeve 15. The lower portion of the bottom surface 51 as shown in FIG. 1 is parallel with the axis of spark plug 12. The upper portion of the groove 50, as shown in FIG. 1, has a radius portion, designated 53, which extends from the bottom surface 51 and curves away from the axis of spark plug 11 and intersects the outer periphery of the spark plug 11. It should be clear that the groove 50 does not destroy the upper seal 33 which is provided between the metal sleeve and the ceramic sleeve 15. It should also be clear from the drawings that the groove extends completely through the threaded base 26 of the metal shell 20.

Figure 6:
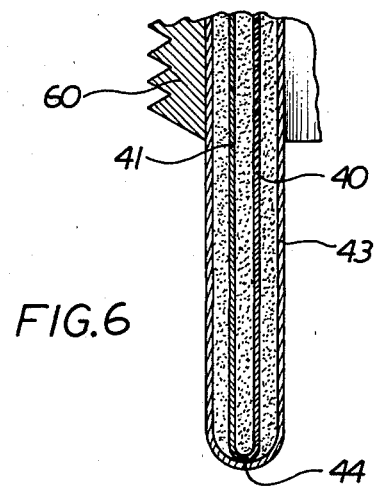
FIG. 6 is a further fragmentary sectional view of the spark plug thermocouple assembly of the present invention on an enlarged scale.
Figure 7:
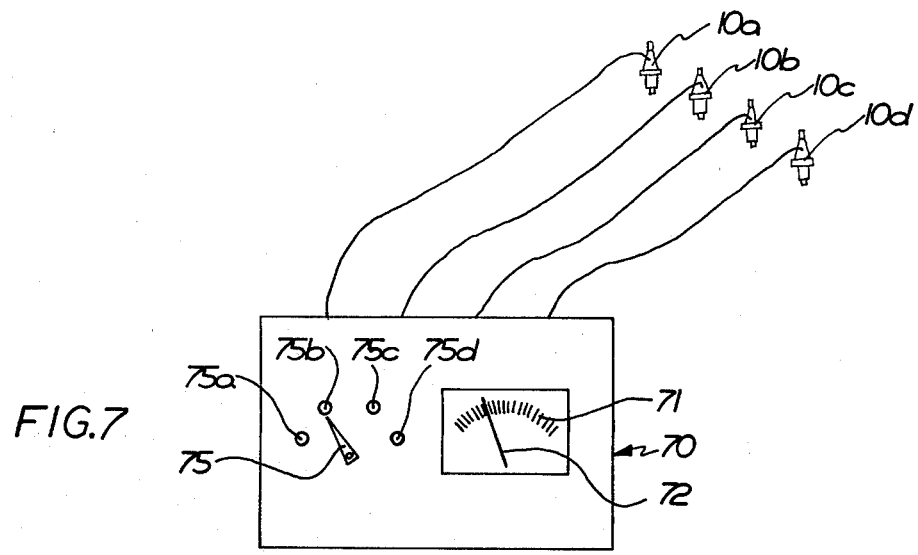
FIG. 7 is a view of plural spark plug-thermocouple assemblies mounted according to the present invention and the thermocouple leads connected to a voltmeter.

The thermocouple 12 is inserted into the groove 50 and is located so that the temperature-sensing junction 44 thereof projects from the threaded base 26 and is located below the gap 22 between the electrodes 16 and 21 of the spark plug 11. After the thermocouple 12 is located in the groove 50, brazing material is positioned in the groove and fills the groove to the outer periphery of the metal sheath 43. The brazing material is best shown in FIGS. 6 and 7 and is designated 60.

Figure 5:
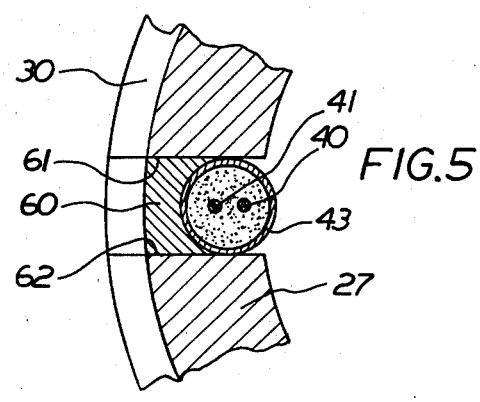
FIG. 5 is a partial sectional view of the spark plug thermocouple assembly of FIG. 1 taken along lines 5—5 of FIG. 1.

As shown in FIGS. 4 and 5, the sidewalls of the groove 50, designated 61, 62, are parallel to each other and are spaced apart a distance approximately equal to the diameter of the thermocouple sheath 43. After the brazing material fills the groove 60, the continuous threads 30 are reformed through the brazing material so as to provide a continuous thread completely around the metal shell. Thus, after the thermocouple is assembled in position in the groove 50, the spark plug assembly 10 is capable of being threaded into engagement with the corresponding threads 31 in the internal combustion engine in which the spark plug 11 is recommended to be used.

It should be clear that when the spark plug thermocouple assembly 10 is assembled in the internal combustion engine, the thermocouple projects into the internal combustion cylinder chamber and the temperature-sensing junction 44 is located directly in the chamber of the cylinder of the internal combustion engine. The relationship between the spark plug 11 and the cylinder head 65 is not affected by the modification of the spark plug 11. Also, no modification of the engine is necessary. The electrical socket 27 can be connected in the normal manner without interfering with the operation of the spark plug 11 or the thermocouple 12.

Furthermore, the introduction of the groove 50 into the spark plug 11 and the assembly of the thermocouple 12 into groove 50 does not affect the position of the ground electrode 21 and the center electrode 16 with respect to each other. The spatial relationship of the ground electrode 21 and the center electrode with respect to the internal combustion engine cylinder is also unaffected. It is obvious that the spark plug 12 of the spark plug thermocouple assembly 10 retains all the operational characteristics of an unmodified spark plug.

As discussed hereinabove, the spark plug thermocouple assembly 10 is used in analyzing the operation of an internal combustion engine for purposes of adjusting the engine. It is known that the temperature in a cylinder of an internal combustion engine is related to certain engine operating characteristics, such as the air-fuel ratio which is delivered to the cylinder. If the air-fuel ratio is too high or too low, this will affect the temperature in the internal combustion engine. The temperature in the cylinder of a particular internal combustion engine supplied with an air-fuel mixture which has the proper air-to-fuel ratio is known. This, of course, is a standard temperature against which the particular engine which is being analyzed and adjusted can be compared. This temperature will vary from engine to engine. For example, a particular General Motors V-8 engine may have one standard temperature while a particular General Motors V-6 engine may have another standard. Accordingly, with the use of the present invention, the temperature in the cylinder of a particular internal combustion engine can be determined. That temperature can be compared with the standard and if there is a difference, the air-fuel ratio being delivered into the combustion chamber of the engine can be varied until the standard temperature is achieved. In addition, the temperature in the various cylinders of the same engine can be compared to monitor the performance of the air-fuel mixture distribution system.

To accomplish the above, the thermocouple 12 is attached to a readout device 70 (see FIG. 7). The readout device may be digital, analog or a written read out on a chart. As shown in the drawings, an analog read out is provided in the form of a voltmeter 70. The voltmeter 70 has a gauge 71 with a needle 72. The gauge 71 is calibrated in degrees fahrenheit. The needle 72 moves relative to the gauge 71 to indicate the temperature in a given cylinder with which the spark plug thermocouple assembly is associated.

For purposes of testing the temperature of all of the cylinders of the internal combustion engine, the voltmeter 70 may be associated with a plurality of spark plug thermocouple assemblies 10. This is shown in FIG. 7. In this case the voltmeter 70 would have a selector switch 75 thereon, and the selector switch would have a position in which each respective thermocouple assembly is connected to the drive mechanism for driving the needle 72. Accordingly, by moving the selector switch 75 between these positions, each of the thermocouple assemblies are connected with the needle 72, and, therefore, the temperature can be read in each of the cylinders in which the thermocouple assemblies are attached.

As shown in FIG. 7, there are four thermocouple assemblies which are designated 10a, 10b, 10c, 10d. There are also four positions of the selector switch 75. These are designated 75a, 75b, 75c, 75d. Accordingly, when the selector switch 75 is located in position 75a, the temperature in the cylinder in which the spark plug thermocouple assembly 10a is mounted will be read by the gauge 71, and the temperature in the other cylinders will be read in other positions of the selector switch 75.

In view of the above, it should be clear that the present invention provides a spark plug thermocouple assembly which can be threaded into an internal combustion engine. The spark plug is the recommended spark plug for the engine. By then operating the engine and reading the temperature on the gauge 71 which is associated with the spark plug thermocouple assembly, the comparison can be made between temperature in the cylinder of the engine with the standard temperature, if the engine was operating perfectly. In the case of a discrepancy in the temperature in the cylinder versus the standard temperature, adjustment of the air-fuel ratio can be made in order to make the temperatures correspond. The construction of the spark plug thermocouple assembly is such that the temperature-sensing junction in the combustion chamber is located so that there is no detrimental or adverse affect created on the temperature-sensing element due to the gap between the electrodes.

Figure 9:
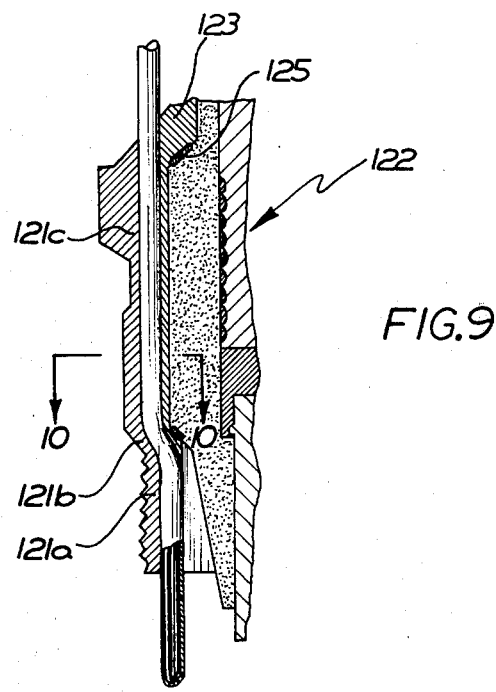
FIG. 9 is a sectional view of a spark plug thermocouple assembly similar to FIG. 1 but of a modified construction.
Figure 10:
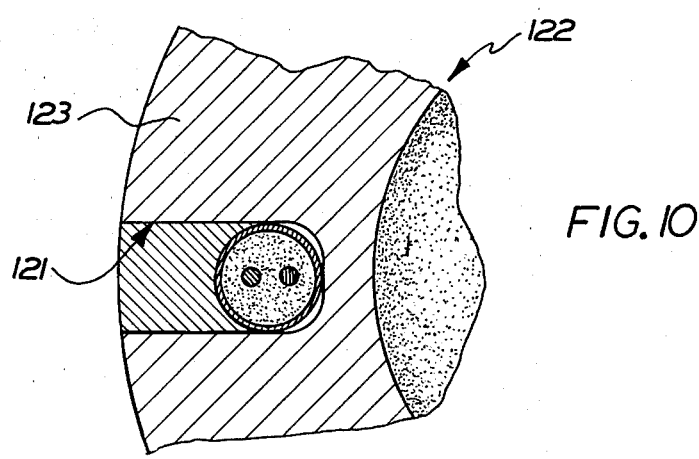
FIG. 10 is a sectional view taken along the line 10—10 of FIG. 9.

In the embodiment of FIGS. 9 and 10 the groove 121 is formed in the spark plug 122 by a milling operation. Moreover, the groove is formed only in the metal shell 123. Also in cross section the groove has a dog leg configuration, as shown in FIG. 10. Specifically, the temperature sensing junction of the thermocouple is located as in the embodiment of FIG. 1. The thermocouple extends along the portion 121a of the groove which lies parallel to the axis of the spark plug. The portion 121b of the groove extends radially outwardly of the spark plug and at an angle other than 90 degrees to the axis of the spark plug. The portion 121c of the groove extends parallel to the axis of the spark plug and does not destroy the seal 125. The embodiment of FIGS. 9 and 10 make it unnecessary to form a thermocouple receiving groove in the porcelain part of the spark plug.

What is claimed is:

1. Apparatus for use in sensing the temperature in a cylinder of an internal combustion engine, said apparatus comprising a spark plug having a central electrode located on the axis of said spark plug, a ceramic insulator encircling said centrally located electrode, a metal casing encircling said ceramic insulator, a second electrode extending from said metal casing to a position adjacent to said electrode but displaced axially therefrom, said metal casing having continuous threads formed therein and encircling said metal casing for threaded engagement with corresponding threads of an internal combustion engine, and a thermocouple located within the outer periphery of said metal casing and extending to a position adjacent to said gap between said electrodes, said thermocouple having a temperature-sensing junction adjacent to said gap and which junction is located in the cylinder when the spark plug is threaded with the corresponding threads of the engine, and a meter connected with said thermocouple for indicating the temperature in the cylinder.

2. Apparatus as defined in claim 1, wherein said thermocouple comprises a pair of wires of dissimilar material which are fused to each other to form said temperature-sensing junction, said wires being located in a metal sheath and being attached to said metal sheath at said junction.

3. Apparatus as defined in claim 1, wherein said metal casing and said ceramic insulator have a groove therein, said thermocouple being located in said groove, said groove being at least partially filled with a metal material and said metal material being threaded to form said continuous threads on said metal casing.

4. Apparatus as defined in claim 3, further including a seal located between said metal casing and said ceramic material, and said groove being formed in said metal casing at a location spaced from said seal.

5. Apparatus as defined in claim 1 wherein a seal is provided between said metal casing and said ceramic insulator.

6. A method of adjusting an operating parameter of an internal combustion engine, which engine has a recommended spark plug to be used in the engine, said method comprising the steps of selecting a recommended spark plug having threads for engaging corresponding threads in the internal combustion engine, assembling a thermocouple within the outer periphery of the spark plug so as to not affect the ability of said threads to threadedly engage the corresponding threads in the engine, locating the temperature sensing junction of the thermocouple adjacent the gap of the spark plug, threading said spark plug and thermocouple into the corresponding threads of the engine to locate the temperature sensing junction in a cylinder of the engine, thereafter operating the engine, sensing the output signal produced by said thermocouple, comparing that output signal with a standard for the engine parameter to be adjusted, and adjusting said parameter when the output signal is not the same as said standard, said step of assembling a thermocouple within the periphery of the spark plug comprising the further steps of forming a groove within the outer periphery of said spark plug, placing said thermocouple within said groove, at least partially filling said groove with a metal material, and threading said metal material so as to not affect the ability of said threads to threadedly engage the corresponding threads in the engine.

7. The method of claim 6 wherein the step of forming a groove within the outer periphery of said spark plug comprises the further step of forming a groove which extends through at least a portion of the metal casing of said spark plug and into the insulator of said spark plug.

8. The method of claim 7 further including providing at least one seal between said metal casing and said insulator.

* * * * *